United States Patent [19]

Bockhorst et al.

[11] 4,264,950
[45] Apr. 28, 1981

[54] INTRINSICALLY SAFE REGULATED POWER SUPPLY

[75] Inventors: Rhea W. Bockhorst; Wiley E. Zimmerman, both of Ponca City, Okla.

[73] Assignee: Conoco, Inc., Ponca City, Okla.

[21] Appl. No.: 917,831

[22] Filed: Jun. 22, 1978

[51] Int. Cl.³ .................... H02M 3/335; H02M 1/18
[52] U.S. Cl. ...................................... 363/25; 363/56; 363/97
[58] Field of Search .................. 323/9; 363/24–28, 363/34, 37, 41, 55–57, 96, 97, 133, 134, 139; 361/18

[56] References Cited

U.S. PATENT DOCUMENTS

| 3,197,691 | 7/1965 | Gilbert | 363/28 |
| 3,372,327 | 3/1968 | Morgan | 363/124 |
| 3,378,751 | 4/1968 | Walker | 363/56 |
| 3,701,937 | 10/1972 | Combs | 323/21 |
| 3,916,283 | 10/1975 | Burrows | 363/26 |

Primary Examiner—William M. Shoop

[57] ABSTRACT

An intrinsically safe regulated power supply has an input connected to a source of power and an output connected to a voltage-limited diode. The output current is limited by having a current sensor placed in series between the output terminal of the regulator and the diode. The current sensor generates an output which is applied to a differential amplifier. The differential amplifier develops an output voltage which is proportional to the current passing through the current-sensing means. This voltage is converted to a corresponding frequency which forms pulses having a repetition rate proportional to the frequency from the voltage-to-frequency converter but having a constant width. Pulses are applied to output transistors which control the current through the primary of a transformer. An excessive output current will convert the pulses to a low repetition rate, drastically cutting the voltage which will prevent excessive current through the load. Internal failures will electrically discontinue power transmission to the secondary of the transformer.

2 Claims, 7 Drawing Figures

//  4,264,950

INTRINSICALLY SAFE REGULATED POWER SUPPLY

BRIEF DESCRIPTION OF THE PRIOR ART

The prior art patents, such as U.S. Pat. No. 3,863,125, operate on measuring some perimeter which, when exceeded, triggers a portion of the circuit so that it becomes inoperative. For example, an oscillator which is generating the output voltage ceases operations when a perimeter, such as voltage or current, exceeds a predetermined threshold.

U.S. Pat. Nos. 3,800,198; 3,824,441; 3,748,569; 3,512,044; 2,114,687; and 4,045,887 are other examples of the same type circuit.

U.S. Pat. No. 3,911,352 is a similar patent to those mentioned above and differs only in that it reduces the frequency of the oscillator supplying power to the transformer when a short occurs. In this respect only, it has some similarity to the operation of our invention.

BRIEF DESCRIPTION OF THE INVENTION

The intrinsically safe regulated power supply is accomplished by limiting both the voltage and the current which can be delivered by the power supply so that if the current, for example, exceeds a predetermined limit, such as would result in a partial or full short, the voltage from the power supply will drop to a value where the current will not damage the power supply, thereby preventing damaging currents from causing fires as a consequence of the short in hazardous areas such as, for example, a coal mine.

The invention operates by passing a current from a voltage rectifier through a resistor to the load which includes a zener diode in parallel with the load. The current to either the load or the diode or diodes is measured by the series resistor which acts as a current sensing means. The voltage drop across the resistor is communicated to a differential amplifier which develops an output signal inversely proportional to the current passing through the resistor. A voltage-to-frequency converter receives the output from the differential amplifier and develops a pair of pulses which are 180° out of phase. The pulses have a constant width but varying repetition rate and are applied to each side of the center-tapped transformer through suitable driving means, such as transistors. The secondary of the transformer is rectified and applied to the output as previously mentioned through the current measuring transistor. As long as the current remains within prescribed limits, the pulses will sequentially pass through one side or the other of the center-tapped primary, developing an output voltage which will either be delivered as power to the utilizing circuit or through a zener diode. When, for example, a short occurs, excessive current will be drawn through the resistor causing the pulses being developed by the voltage-to-frequency converter to be generated as if the power supply were delivering current to a light load. Any failure of any power supply component will cause the pulses to pass simultaneously through each side of the primary, thereby delivering no current to the load.

DETAILED DESCRIPTION OF THE FIGURES

Figure 1:
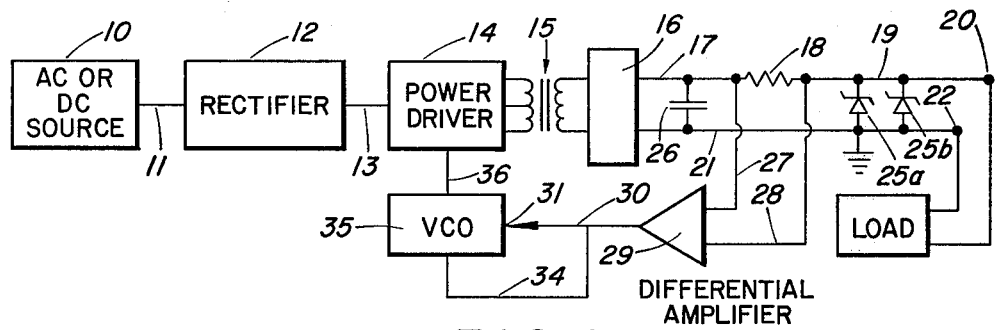
FIG. 1 is a block diagram illustrating the components of the power supply.

Referring to all of the figures but in particular to FIG. 1, an intrinsically safe regulated power supply is illustrated. A source of power 10, which may be either AC or DC, is coupled through a wire 11 and through a rectifier 12, if needed (if the input is AC), and another wire 13 to the input of a power driver 14. The output of power driver 14 is coupled through a transformer 15 to a rectifier 16. The output from rectifier 16 is coupled through a wire 17 to a resistor 18 which is further coupled through a wire 19 to output terminal 20.

The ground connection from rectifier 16 is coupled through a wire 21 to the remaining output ground terminal 22. A pair of zener diodes 25a and 25b is connected across output terminals 20 and 22. A filter capacitor 26 is connected across output wires 17 and 21 from rectifier 16. Voltage generated by current passing through resistor 18 is coupled through wires 27 and 28 to a differential amplifier 29. The output from differential amplifier 29 is coupled through wire 30 to the input 31 of a voltage-to-frequency converter 35. The output from voltage-to-frequency converter is coupled through a wire 36 to the input of power driver 14.

Figure 2:
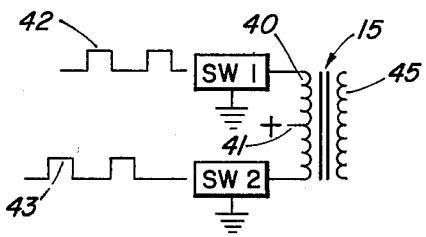
FIG. 2 is a block diagram illustrating the operation of the voltage-to-frequency converter in operation with the power driver and transformer.

Power driver 14 essentially comprises two transistors which are referred to as switch 1 (SW 1) and switch 2 (SW 2) illustrated in FIG. 2. SW 1 and SW 2 are each connected to opposite ends of a center-tapped primary 40 of transformer 15. The center-tap 41 of primary 40 is connected to a positive source of power.

Figure 3:
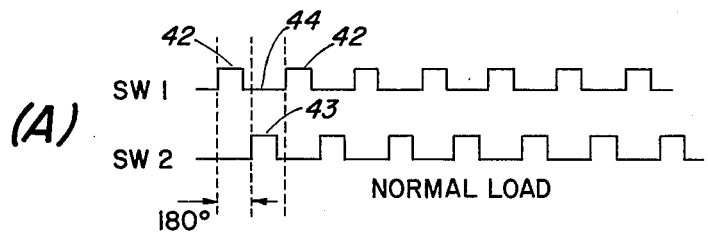
FIGS. 3(A), (B), and (C) illustrate the pulse outputs from the voltage-to-frequency converter during various operational conditions.
Figure 3:
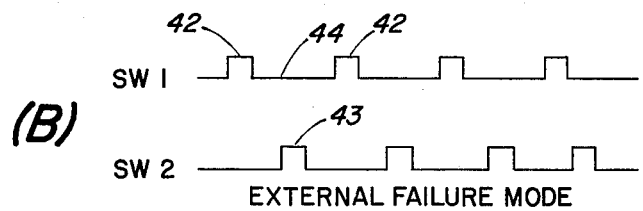
Figure 3:
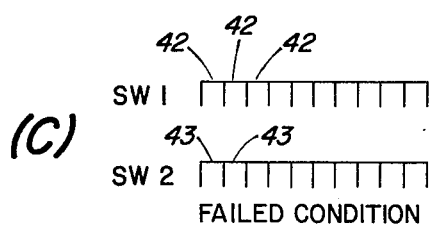
Figure 4:
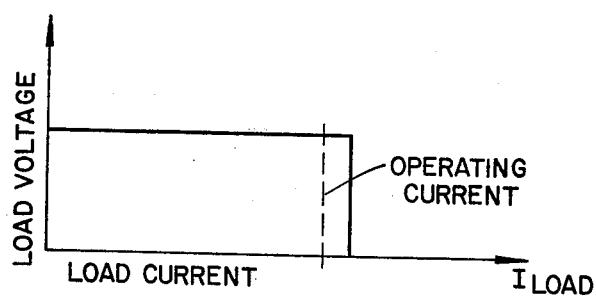
FIG. 4 is a voltage current diagram of the output of the power supply.

Referring to FIGS. 2, 3, and 4 in particular, a brief description of the operation of the block diagram shown in FIG. 1 is as follows:

The voltage-to-frequency converter will develop pulses 42 and 43 which are applied to SW 1 and SW 2, respectively. Each of the pulses 42 and 43 has a constant width but varying in the repetition rate of the pulses. The repetition rate is determined by the voltage sensed across resistor 18. This voltage, when applied to differential amplifier 29, will develop an output voltage proportional to the magnitude of the voltage across resistor 18. Output from differential amplifier 29 is applied through a wire 30 to the input 31 of voltage-to-frequency converter 35. Any variations in the current being delivered from rectifier 16 to the zener diodes 25a and 25b and the load will be reflected in variations in voltage across resistor 18 which are applied through wires 27 and 28 to differential amplifier 29. Under normal operating ranges the current passing through resistor 18 will be a steady state current which will be divided between the load and the zener diodes 25a and 25b; therefore, as the load current increases the zener diode current will decrease.

Referring to FIG. 3(A) a diagram of the normal load pulses being applied to switch 1 and switch 2 is illustrated. Each pulse 42 and 43 is spaced 180° apart with a constant width. The repetition rate, however, of the pulses is controlled by the voltage from differential amplifier 29 which is applied to input 31 of the voltage-to-frequency converter 35.

Under normal conditions, as previously mentioned, the current through resistor 18 will remain constant so the system will remain in a steady state condition with the zener diodes 25a and 25b acting as the primary voltage regulator for varying loads; however, if the input voltage to transformer 15 should change, the voltage generated by rectifier 16 will change. This change will be reflected in a decrease or increase in current through resistor 18 and will result in a corresponding voltage change across the resistor. For an increase in voltage across resistor 18, an increase in voltage will be generated by differential amplifier 29 and applied to input 31 of voltage-to-frequency converter 35. An increase is exhibited by a decrease in frequency at the output of wire 36 of converter 35. If, in fact, the increase in current is caused by a short or partial short, the system will be driven to the light load situation which is illustrated by the wave forms shown in FIG. 3(B). Failure of the zener diodes is almost always in the shorted condition. Thus, any failure of the zener diodes will short the outputs 20 and 22, causing the differential amplifier to drive the voltage-to-frequency converter to the light load situation as illustrated by FIG. 3(B). Any other failure, for example, to the components within the circuit, will cause the power driver to either switch off completely or be driven by the voltage-to-frequency converter at a repetition rate which is substantially DC. Such a situation is illustrated in FIG. 3(C). Basically, the frequency output of the voltage-to-frequency converter 35 increases to a frequency which is so high that the repetition rates being delivered to switch 1 and switch 2 overlap, driving each side of transformer 15 with a virtually DC signal. Failure of any internal component will cause the situation as previously described.

Figure 5:
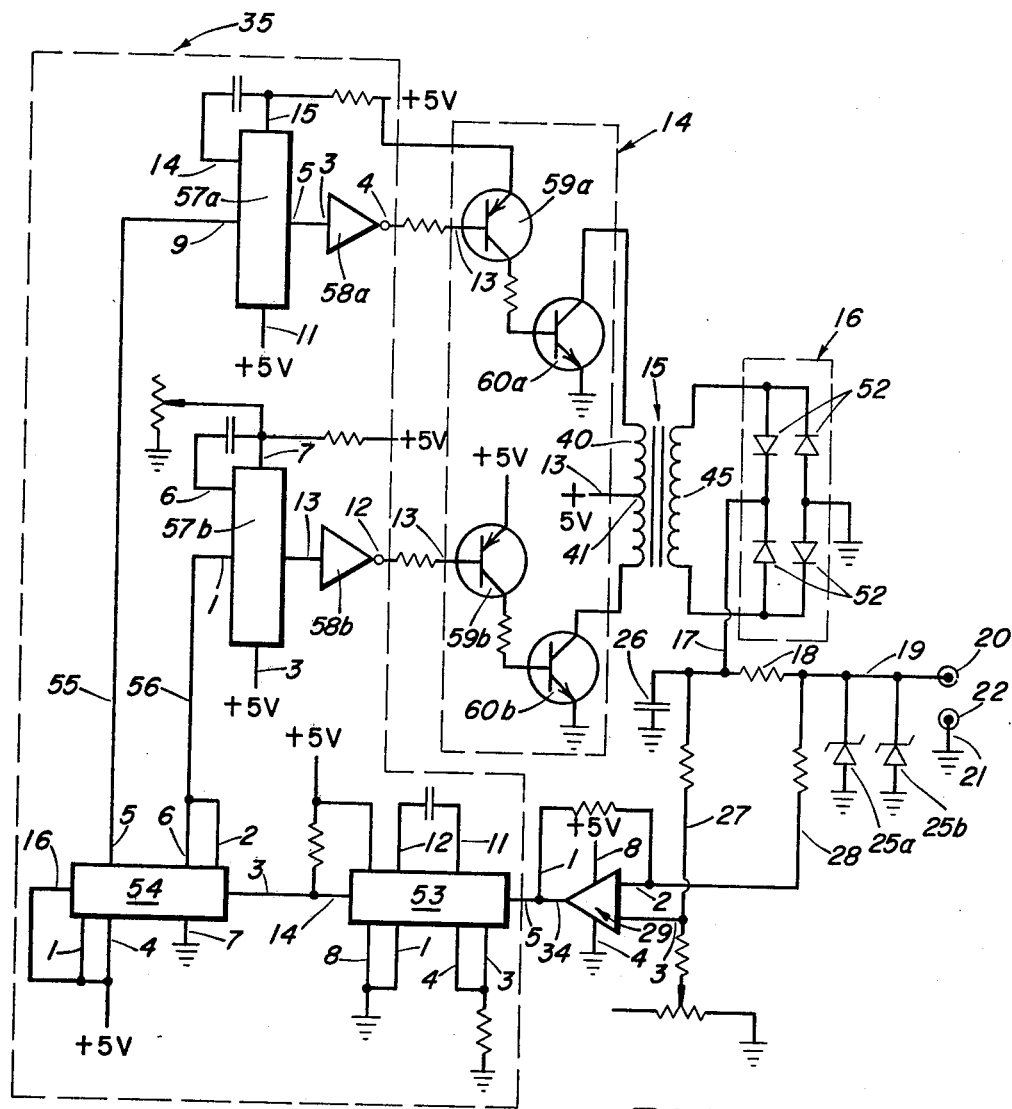
FIG. 5 is a more detailed circuit diagram of the power supply.

Referring to FIG. 5 a detailed circuit diagram of the intrinsically safe regulated power supply is illustrated. A positive 5 volts is supplied through wire 13 to the center-tap 50 of transformer 15. The secondary 45 of transformer 15, as previously discussed, is connected to a rectifier 16 which includes the usual diodes 52. Differential amplifier 29 is an integrated circuit LM358 manufactured by National Semiconductor which has its terminals 2 and 3 connected, respectively, through wires 27 and 28 across current sensing resistor 18. Its output from terminal 1 is is applied to the input terminal 5 of voltage-to-frequency converter 35 through wire 34. Voltage-to-frequency converter 35 comprises several integrated circuits. The voltage-to-frequency converter comprises an integrated circuit 53 which is an AD537 manufactured by Analog Devices and has its output from pin 14 connected to the input pin 3 of a second integrated circuit 54 which develops 2 square waves 180° out of phase at the outputs on pins 5 and 6, respectively. These square waves are communicated through wires 55 and 56 to pins 9 and 1 of an integrated circuit 57a and 57b which is a part No. 74123 manufactured by Analog Devices. The output from voltage-to-frequency converter 35 passes through amplifiers 58a and 58b which is an integrated circuit part No. DN7406 also manufactured by Analog Devices to the input of power driver 14. Power driver 14 comprises 4 transistors 59a and 59b which are part No. GE21 and 60a and 60b which are part No. 2N5302. The square waves which are 180° apart on wires 55 and 56 are applied to integrated circuits 57a and 57b as previously described which are single-shot multivibrators and operate off the positive leading edge of the pulses from integrated circuit 54. The output from single-shot multivibrators has a constant width, and the frequency of the square waves is dependent upon the frequency of the square waves from the integrated circuit 54.

The operation of the power supply has been previously discussed; however, it should be noted in the circuit shown in FIG. 5 that if any circuit fails (any of the integrated circuit units or transistors) the circuit will either fail on or off. If it fails off, no power will be transferred across the primary to the secondary 45 of transformer 15. If it fails on, then a steady state condition will be reached after the first pulse is past and no power after the first pulse will be transferred to secondary 45. A short between terminals 20 and 22 or of either of the zener diodes 25a or 25b will cause an increase in current through resistor 18 which will create a buildup in voltage across resistor 18. The voltage-to-frequency converter sensing the increase in voltage will immediately lower the voltage on wire 17 to its predetermined value. The voltage will lower to the point where the power supply will be seeing a light load. Thus little or no power will be passing across the primary to secondary 45 of transformer 15. Resistor 18 need only have enough wattage dissipation to handle the light load current.

It is obvious that modifications and changes can be made to the application and still be within the spirit and scope of the invention as disclosed in the specification and appended claims.

What is claimed is:

1. An intrinsically safe regulated power supply having a transformer including a center-tapped primary and a secondary wrapped on a core, rectifier means connected across said secondary having a pair of output terminals; current sensing means serially connected between the output of said rectifier means and said output terminals for generating a voltage across said current sensing means in correspondence to an increase or decrease in current through said current sensing means; voltage differential amplifier means having its input receiving the voltage from said current sensing means and developing at its output a signal which is inversely proportional to the current through said current sensing means; a voltage-to-frequency converter means receiving at its input said voltage output from said differential amplifier means and which develops at first and second outputs a first and second train of pulses, respectively, which pulses are a constant width and varying frequency and 180° out of phase; and power driver means having first and second inputs connected to said first and second outputs of said voltage-to-frequency converter means and having first and second outputs connected to the input of said primary so that variations in current demand through said current sensing means will result in corresponding variations in the output of said pulses from said voltage-to-frequency converter, however, excessive current through said current sensing means will cause said voltage-to-frequency converter to generate output pulses having a low repetition rate resulting in the output current dropping within safe limits thereby preventing burnout of said power supply.

2. An intrinsically safe regulated power supply comprising:
   (a) a transformer having a center-tapped primary and a secondary;

(b) rectification means connected across said secondary and having a positive pole and a ground;

(c) resistor means for sensing current flow and generating a voltage proportional to said current, said resistor means being connected in series between said positive pole and a regulated power supply output terminal;

(d) diode means connected across said output terminal;

(e) differential amplifier means having its input connected across said resistor means and developing at an output, a voltage proportional to the voltage generated across said resistor means;

(f) voltage-to-frequency converter means having its input coupled to the output of said differential amplifier means and forming at its output a pair of pulses 180° out of phase with each other, each pulse having a constant width and variable repetition rate the frequency of which is inversely proportional to the input voltage from the differential amplifier;

(g) a source of power having a pair of output terminals;

(h) first and second power driver means having their output means connected respectively from each side of said primary to one output terminal of said source of power;

(i) power driver input control means coupled to the first and second outputs respectively of said voltage-to-frequency converter; and (j) means for coupling said center-tap to the remaining output terminal of said source of power;

whereby the current through said resistor means will be limited by the pulse repetition rate generated by said voltage-to-frequency converter thereby making said power supply intrinsically safe.

* * * * *